US008185695B2

United States Patent
Conway et al.

(10) Patent No.: US 8,185,695 B2
(45) Date of Patent: May 22, 2012

(54) SNOOP FILTERING MECHANISM

(75) Inventors: Patrick Conway, Los Altos, CA (US); Kevin Michael Lepak, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 974 days.

(21) Appl. No.: 12/164,871

(22) Filed: Jun. 30, 2008

(65) Prior Publication Data

US 2009/0327616 A1      Dec. 31, 2009

(51) Int. Cl.
*G06F 12/08*       (2006.01)
*G06F 13/00*       (2006.01)

(52) U.S. Cl. ........ 711/133; 711/141; 711/144; 711/145; 711/146; 711/E12.026; 709/213; 709/218

(58) Field of Classification Search .................. None
See application file for complete search history.

(56) References Cited

U.S. PATENT DOCUMENTS

| | | | |
|---|---|---|---|
| 5,410,669 A | 4/1995 | Briggs et al. | |
| 5,905,998 A * | 5/1999 | Ebrahim et al. | 711/144 |
| 6,138,217 A * | 10/2000 | Hamaguchi | 711/141 |
| 6,487,685 B1 * | 11/2002 | Fiske et al. | 714/701 |
| 6,868,485 B1 * | 3/2005 | Conway | 711/154 |
| 7,096,323 B1 * | 8/2006 | Conway et al. | 711/147 |
| 2002/0087778 A1 | 7/2002 | Schoinas | |
| 2002/0194433 A1 * | 12/2002 | Yamazaki | 711/136 |
| 2004/0260880 A1 * | 12/2004 | Shannon et al. | 711/122 |
| 2005/0144397 A1 * | 6/2005 | Rudd et al. | 711/144 |

FOREIGN PATENT DOCUMENTS

WO    WO 2004029776    4/2004

OTHER PUBLICATIONS

International Search Report and Written Opinion; Application No. PCT/US2009/003878; mailed Oct. 6, 2009.

* cited by examiner

*Primary Examiner* — Michael Krofcheck
(74) *Attorney, Agent, or Firm* — Rory D. Rankin; Meyertons, Hood, Kivlin, Kowert & Goetzel,

(57) ABSTRACT

A system and method for selectively transmitting probe commands and reducing network traffic. Directory entries are maintained to filter probe command and response traffic for certain coherent transactions. Rather than storing directory entries in a dedicated directory storage, directory entries may be stored in designated locations of a shared cache memory subsystem, such as an L3 cache. Directory entries are stored within the shared cache memory subsystem to provide indications of lines (or blocks) that may be cached in exclusive-modified, owned, shared, shared-one, or invalid coherency states. The absence of a directory entry for a particular line may imply that the line is not cached anywhere in a computing system.

15 Claims, 7 Drawing Sheets

SNOOP FILTERING MECHANISM

BACKGROUND OF THE INVENTION

1. Field of the Invention

This invention relates to high performance computing network systems, and more particularly, to maintaining efficient cache coherency across multi-processor nodes.

2. Description of the Relevant Art

In modern microprocessors, one or more processor cores, or processors, may be included in the microprocessor, wherein each processor is capable of executing instructions in a superscalar pipeline. The microprocessor may be coupled to one or more levels of a cache hierarchy in order to reduce the latency of the microprocessor's request of data in memory for a read or a write operation. Generally, a cache may store one or more blocks, each of which is a copy of data stored at a corresponding address in the system memory. As used herein, a "block" is a set of bytes stored in contiguous memory locations, which are treated as a unit for coherency purposes. In some embodiments, a block may also be the unit of allocation and deallocation in a cache. The number of bytes in a block may be varied according to design choice, and may be of any size. As an example, 32 byte and 64 byte blocks are often used.

In order to increase computing performance, a computing system may increase parallel processing by comprising subsystems such as processing nodes, each node including one or more microprocessors. Each microprocessor within a processing node, or node, may have its own cache hierarchy. Also, each node may have a higher level of cache hierarchy shared among multiple microprocessors. For example, in one embodiment, a node may comprise two microprocessors, each with a corresponding level one (L1) cache. The node may have an L2 cache shared by the two microprocessors. A memory controller or other interface may couple each node to other nodes in the computing system, to a higher level of cache hierarchy, such as a L3 cache, shared among the multiple nodes, and to dynamic random-access memory (DRAM), dual in-line memory modules (dimms), a hard disk, or otherwise. In alternative embodiments, different variations of components and coupling of the components may be used.

Since a given block may be stored in one or more caches, and further since one of the cached copies may be modified with respect to the copy in the memory system, computing systems often maintain coherency between the caches and the memory system. Coherency is maintained if an update to a block is reflected by other cache copies of the block according to a predefined coherency protocol. Various specific coherency protocols are well known.

Many coherency protocols include the use of messages, or probes, passed from a coherency point, such as a memory controller, to communicate between various caches within the computing system. A coherency point may transmit probes in response to a command from a component (e.g. a processor) to read or write a block. Probes may be used to determine if the caches have a copy of a block and optionally to indicate the state into which the cache should place the block. Each probe receiver responds to the probe, and once all probe responses are received the command may proceed to completion.

Computer systems generally employ either a broadcast cache coherency protocol or a directory based cache coherency protocol. In a system employing a broadcast protocol, probes are broadcast to all processors (or cache subsystems). When a subsystem having a shared copy of data observes a probe resulting from a command for exclusive access to the block, its copy is typically invalidated. Likewise, when a subsystem that currently owns a block of data observes a probe corresponding to that block, the owning subsystem typically responds by providing the data to the requester and invalidating its copy, if necessary.

In contrast, systems employing directory based protocols maintain a directory containing information indicating the existence of cached copies of data. Rather than unconditionally broadcasting probes, the directory information is used to determine particular subsystems (that may contain cached copies of the data) to which probes need to be conveyed in order to cause specific coherency actions. For example, the directory may contain information indicating that various subsystems contain shared copies of a block of data. In response to a command for exclusive access to that block, invalidation probes may be conveyed to the sharing subsystems. The directory may also contain information indicating subsystems that currently own particular blocks of data. Accordingly, responses to commands may additionally include probes that cause an owning subsystem to convey data to a requesting subsystem. Numerous variations of directory based cache coherency protocols are well known.

Since probes must be broadcast to all other processors in systems that employ broadcast cache coherency protocols, the bandwidth associated with the network that interconnects the processors can quickly become a limiting factor in performance, particularly for systems that employ large numbers of processors or when a large number of probes are transmitted during a short period. In addition to a possible bandwidth issue, latency of memory accesses may increase due to probes. For example, when a processor performs a memory request that misses in the processor's cache hierarchy, the required data may be retrieved from DRAM and returned to the memory controller prior to the completion of all the probes. Therefore, the latency of memory accesses increases.

Directory based protocols reduce the number of probes contributing to network traffic by conditionally sending probes, rather than unconditionally sending them. Therefore, systems employing directory based protocols may attain overall higher performance due to lessened network traffic and reduced latencies of memory requests. However, while directory based systems may allow for more efficient cache coherency protocols, additional hardware is often required.

The directory based protocol often includes a directory cache that may be implemented on an Application Specific Integrated Circuit (ASIC) or other semi-custom chip separate from the processor. When the directory cache is implemented on a separate chip, the overall cost of the system may increase, as well as board requirements, power consumption, and cooling requirements. On the other hand, incorporation of a directory cache on the same chip as the processor core may be undesirable, particularly for commodity microprocessors intended for use in both single processor or multiple processor systems. When used in a single processor system, the directory cache would go unused, thus wasting valuable die area and adding cost due to decreased yield.

A third alternative stores directory entries in designated locations of a cache memory subsystem, such as an L2 cache, associated with a processor core. For example, a designated way of the cache memory subsystem may be allocated for storing directory entries, while the remaining ways of the cache are used to store normal processor data. In one particular implementation, directory entries are stored within the cache memory subsystem to provide indications of lines (or blocks) that may be cached in modified, exclusive, or owned coherency states. The absence of a directory entry for a particular block may imply that the block is cached in either shared or invalid states. Further details may be found in P. Conway, Computer System with Integrated Directory and Processor Cache, U.S. Pat. No. 6,868,485, 16005.

However, the third alternative is not able to provide a high coverage ratio without occupying a significant portion of a frequently used cache. If a significant portion is used for the directory, then less lines for data may be used within the cache. Therefore, more cache misses, such as capacity and conflict misses, may occur. In order to reduce the amount of cache space to use for the directory, lines with certain states may be determined to not be cached. However, the absence of a directory entry for a block may cause probes to be sent and increase network traffic.

In view of the above, efficient methods and mechanisms for a cache coherency protocol across multi-processor nodes is desired.

SUMMARY OF THE INVENTION

Systems and methods for selectively transmitting probe commands and reducing network traffic are contemplated.

In one embodiment, a computing system is provided comprising multiple processing nodes coupled to one another. Each processing node may contain one or more processing cores, one or more corresponding cache memory subsystems, and a shared cache memory subsystem, such as an L3 cache structure. Storage entries within the shared cache memory subsystem may be configured to selectively store either processor data or directory entries comprising directory information for controlling a global coherence protocol. A cache controller for the shared cache memory subsystem may be configured to store a value to control whether at least some of the entries store processor data or directory information.

Directory entries are maintained to filter probe commands and response traffic for certain cache coherent transactions. By storing entries in a shared cache memory subsystem, no extra real estate is needed for a dedicated directory storage. A portion of an L3 cache structure, for example, while the remaining ways of the cache are used to store normal processor data. In one particular implementation, directory entries are stored within the cache memory subsystem to provide indications of lines (or blocks) that may be cached in exclusive-modified, owned, shared, shared-one, or invalid coherency states. The shared-one state indicates all cached copies of the corresponding data exist in a single processing node. The absence of a directory entry for a particular block may imply that the block is not cached anywhere in the computing system. All initial cached copies in the computing system may be given an exclusive-modified state. Thus, when the corresponding cache block is modified, no probe commands are necessary to be transmitted.

Embodiments are possible in which utilization of the shared cache memory subsystem for the storage of directory entries may be selectively enabled based upon whether the subsystem is deployed in a single-processor environment or a multiple-processor environment. Thus, when deployed in a single-processor environment, the storage locations of the shared cache memory subsystem may be utilized exclusively for processor-caching operations, and the non-utilization of dedicated directory storage may be avoided.

Figure 1:
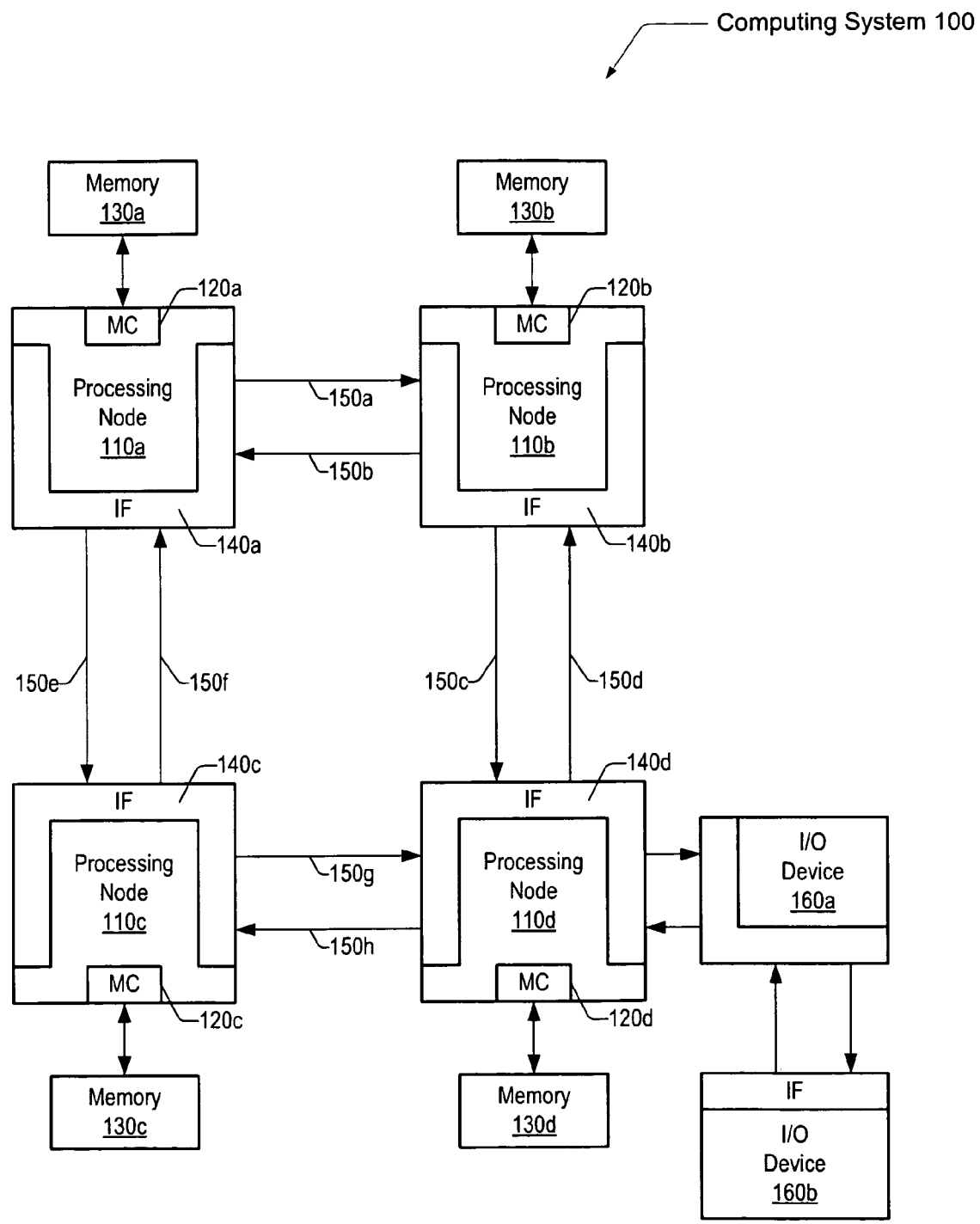
FIG. 1 is a generalized block diagram illustrating one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1, one embodiment of a computing system 100 is shown. Computing system 100 includes a plurality of processing nodes 110a-110d. Although four nodes are shown in FIG. 1, other embodiments may comprise a different number of nodes each comprising one or more processor cores. As used herein, elements referred to by a reference numeral followed by a letter may be collectively referred to by the numeral alone. For example, processing nodes 110a-110d may be collectively referred to as processing nodes 110, or nodes 110. Each node 110 may be coupled to a respective memory 130 via a respective memory controller 120. Additionally, each processing node 110 may include interface logic 140 used to communicate with others of the processing nodes 110. For example, processing node 110a includes interface logic 140a for communicating with processing nodes 110b and 110c. Similarly, processing node 110b includes interface logic 140b for communicating with processing nodes 110a and 110d, and so on. In the embodiment of FIG. 1, processing node 110d is shown coupled to communicate with an input/output (I/O) device 160a via interface logic 140d, and I/O device 160a is further coupled to a second I/O device 160b. Other processing nodes may communicate with other I/O devices in a similar fashion. Alternatively, a processing node may communicate with an I/O bridge, which is coupled to an I/O bus.

Computing system 100 may implement a packet-based link for inter-node communication. In the depicted embodiment, the link is implemented as sets of unidirectional lines (e.g. lines 150a are used to transmit packets from processing node 110a to processing node 110b and lines 150b are used to transmit packets from processing node 110b to processing node 110a). Other sets of lines 150c-150h are used to transmit packets between other processing nodes as illustrated in FIG.

1. The link may be operated in a cache coherent fashion for communication between processing nodes or in a noncoherent fashion as a daisy-chain structure between I/O devices 160a-160b (and additional I/O devices, as desired). It is noted that a packet to be transmitted from one processing node 110 to another may pass through one or more intermediate nodes. For example, a packet transmitted by processing node 110a to processing node 110d may pass through either processing node 110b or processing node 110c as shown in FIG. 1. Any suitable routing algorithm may be used. Other embodiments of computing system 100 may include more or fewer processing nodes than the embodiment shown in FIG. 1. In addition, other embodiments are possible in which each processing node is coupled to every other processing node through a point-to-point network.

In addition to the depicted memory controller and interface logic, each processing node 110 may include one or more processors and associated caches, as described further below. Broadly speaking, a processing node 110 comprises at least one processor and may optionally include a memory controller for communicating with a memory and other logic, as desired.

Memories 130 may comprise any suitable memory devices. For example, a memory 130 may comprise one or more RAMBUS dynamic random access memories (DRAMs), synchronous DRAMs (SDRAMs), DRAM, static RAM, etc. The address space of computing system 100 is divided among memories 130. Each processing node 110 may include a memory map used to determine which addresses are mapped to which memories 130, and hence to which processing node 110 a memory request for a particular address should be routed. In one embodiment, the coherency point for an address within computing system 100 is the memory controller 120 coupled to the memory storing bytes corresponding to the address. Memory controllers 120 may comprise control circuitry for interfacing to memories 130. Additionally, memory controllers 120 may include request queues for queuing memory requests.

Generally, interface logic 140 may comprise buffers for receiving packets from the link and for buffering packets to be transmitted upon the link. Computing system 100 may employ any suitable flow control mechanism for transmitting packets. I/O devices 160 are illustrative of any desired peripheral devices. For example, I/O devices 160 may comprise network interface cards, video accelerators, audio cards, hard or floppy disk drives or drive controllers, Small Computer Systems Interface (SCSI) adapters and telephony cards, modems, sound cards, and a variety of data acquisition cards such as General Purpose Interface Bus (GPIB) or field bus interface cards.

Figure 2:
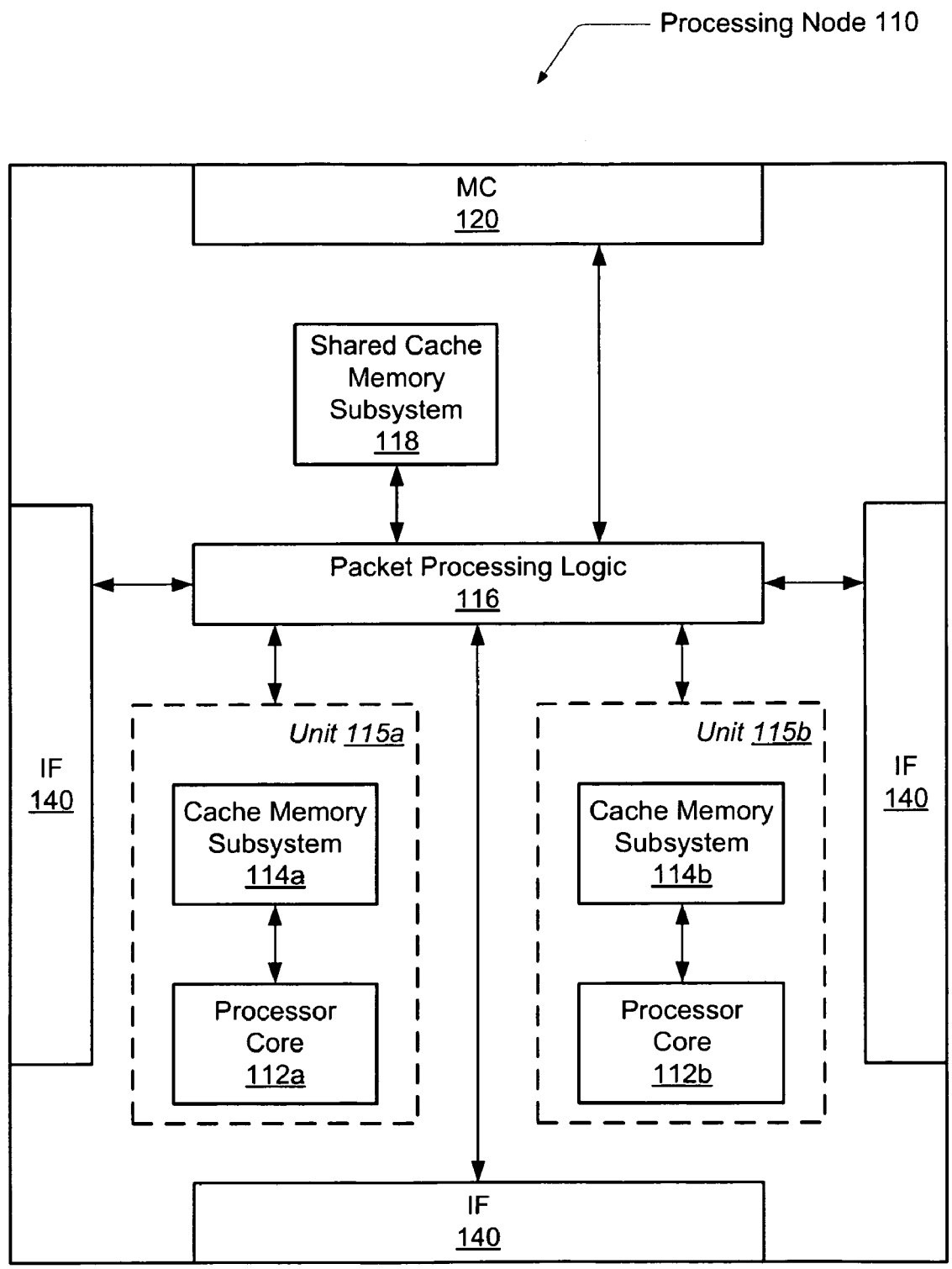
FIG. 2 is a generalized block diagram illustrating one embodiment of an exemplary processing node.

FIG. 2 is a block diagram of one embodiment of an exemplary processing node 110. Circuit portions that correspond to those of FIG. 1 are numbered identically. Processing node 110 may include memory controller 120, interface logic 140, one or more processing units 115, which may include a processor cores 112 and a corresponding cache memory subsystems 114; packet processing logic 116, and a shared cache memory subsystem 118. In one embodiment, the illustrated functionality of processing node 110 is incorporated upon a single integrated circuit.

Generally, packet processing logic 116 is configured to respond to control packets received on the links to which processing node 110 is coupled, to generate control packets in response to processor cores 112 and/or cache memory subsystems 114, to generate probe commands and response packets in response to transactions selected by memory controller 120 for service, and to route packets for which node 110 is an intermediate node to other nodes through interface logic 140. Interface logic 140 may include logic to receive packets and synchronize the packets to an internal clock used by packet processing logic 116.

Cache subsystems 114 and 118 may comprise high speed cache memories configured to store blocks of data. Cache memory subsystems 114 may be integrated within respective processor cores 112. Alternatively, cache memory subsystems 114 may be coupled to processor cores 114 in a backside cache configuration or an inline configuration, as desired. Still further, cache memory subsystems 114 may be implemented as a hierarchy of caches. Caches which are nearer processor cores 112 (within the hierarchy) may be integrated into processor cores 112, if desired. In one embodiment, cache memory subsystems 114 each represent L2 cache structures, and shared cache subsystem 118 represents an L3 cache structure.

Both the cache memory subsystem 114 and the shared cache memory subsystem 118 may include a cache memory coupled to a corresponding cache controller. For the shared cache memory subsystem 118, the cache controller may include programmable logic in order to programmably enable a storage of directory entries within locations of subsystem 118. It is noted when deployed in a single processor environment, all of the storage locations of subsystem 118 may be used for normal cache entries. When deployed in a multiple processor environment, some of the locations of subsystem 118 may be used to store directory entries. The directory entries may be maintained and accessed by a coherency control circuit for controlling coherency operations, which will be described below.

Processor cores 112 include circuitry for executing instructions according to a predefined instruction set. For example, the x86 instruction set architecture may be selected. Alternatively, the Alpha, PowerPC, or any other instruction set architecture may be selected. Generally, processor core 112 accesses the cache memory subsystems 114, respectively, for data and instructions. If the requested block is not found in cache memory subsystem 114 or in shared cache memory subsystem 118, then a read request may be generated and transmitted to the memory controller within the node to which the missing block is mapped.

As will be described in further detail below, in one embodiment of computing system 100, directory entries may be maintained to filter probe commands and response traffic for certain transactions. Rather than storing directory entries in a dedicated directory storage, directory entries may be stored in designated locations of shared cache memory subsystem 118. By utilizing shared cache memory subsystem 118 for the storage of directory entries, the need for a separate directory storage may be avoided. As a result, overall cost may be reduced, as well as required board area, power consumption, and cooling requirements. In one embodiment, an L3 cache structure may be utilized to store the directory. It is noted that High Performance Computing (HPC) applications typically do not rely on the L3 cache. Therefore, utilizing a portion of the L3 cache for storing directory entries may not impact performance.

Figure 3:
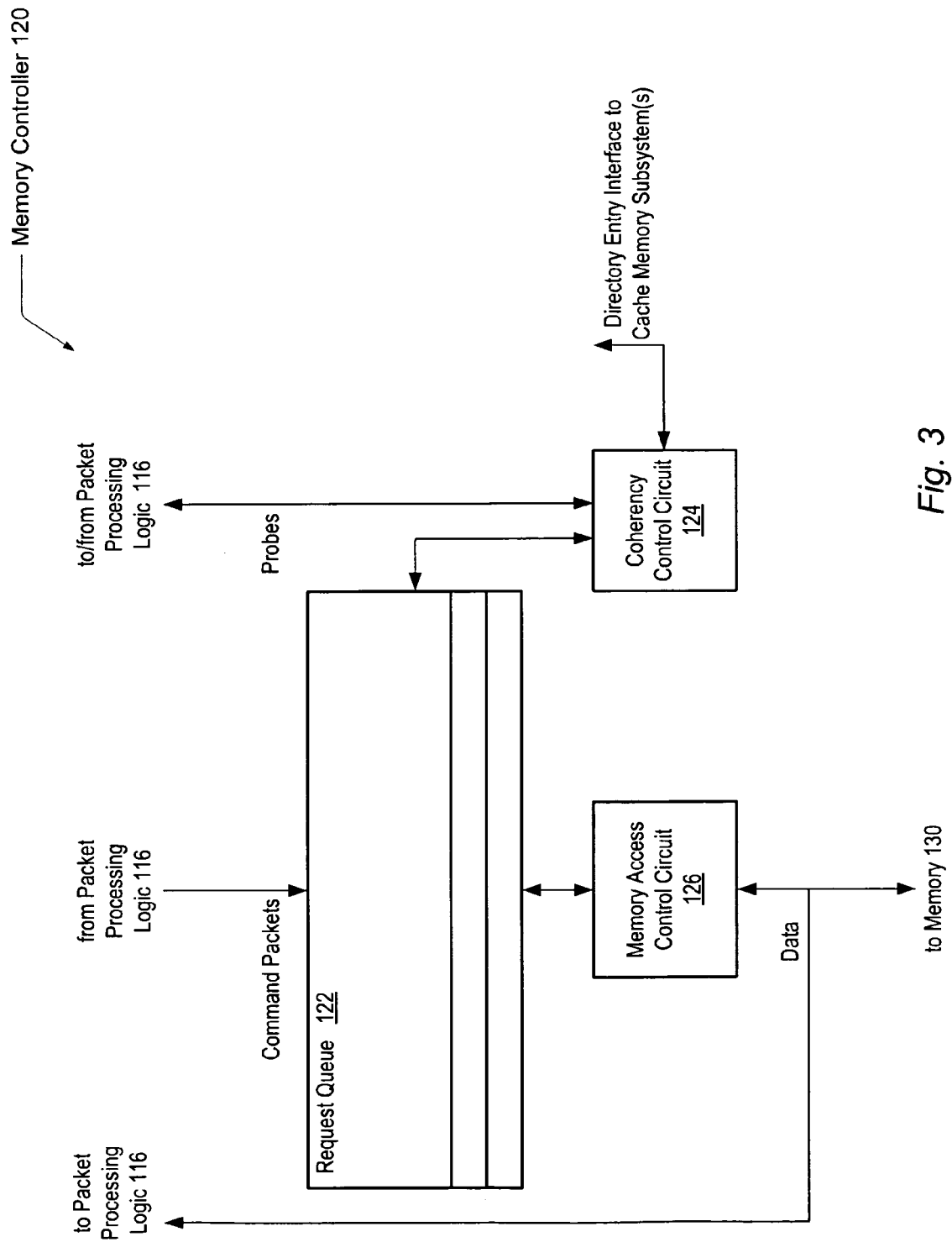
FIG. 3 is a generalized block diagram of one embodiment of a memory controller.

Turning next to FIG. 3, a block diagram of one embodiment of memory controller 120 is shown. In the embodiment of FIG. 3, memory controller 120 includes a request queue 122, a coherency control circuit 124, and a memory access control circuit 126.

Memory controller 120 receives command packets from packet processing logic 116 into request queue 122. The command packets may be routed to memory controller 120 by packet processing logic 116 if the address affected by the command corresponds to a memory location in memory 130. In other words, if the address of the command packet addresses a block stored in memory 130, the command packet is routed to memory controller 120. Memory controller 120 queues the command information in request queue 122, and subsequently processes the command. Coherency control circuit 124 ensures that the command is performed in a coherent fashion. If probes are required for the command, coherency control circuit 124 transmits a probe indication to packet processing logic 116. For example, the probe indication may include the source node and source tag from the corresponding command, the address, the type of command, and other information. Packet processing logic 116 may transmit probe commands in response to the probe indication. Coherency control circuit 124 may further receive packets that indicate a corresponding transaction has completed from packet processing logic 116, and may receive probe responses for write commands. Memory access control circuit 126 may interface with memory 130 to perform commands that are committed by coherency control circuit 124 (e.g. after coherency operations have been transmitted and any responses to be received from other nodes have been received). If the command is a read operation, data may be returned from memory 130 to packet processing logic 116 for forwarding to the source node in a response packet.

Coherency control circuit 124 is additionally configured to maintain directory entries for certain data blocks. As discussed above, these directory entries are stored, in one embodiment, within designated locations of shared cache memory subsystem 118. For this purpose, coherency control circuit 124 may include an interface to the shared cache memory subsystem 118. Coherency control circuit 124 may determine if probes are required for a command based upon the type of command and based upon the presence of a directory entry for the address specified by the command. The directory entries may contain various coherency information, depending upon the implementation. For example, a directory entry may indicate the owner of a given block, whether the block is modified in a given mode, and/or the existence of nodes that have shared copies of the block. Further details regarding various exemplary directory entry formats are provided below.

In one embodiment of computing system 100, directory entries in a probe filter are used to track cache blocks which may have one of the following states: Exclusive-Modified (EM), Owned (O), Shared within only one node (S1), Shared across two or more nodes (S), or Invalidated (I) states. The S and S1 states are share-modified states. A read operation of a cache line with either of these two states does not require probe commands to invalidate other copies of the cache line. No invalidation would be required for a read operation. However, a write operation of a cache line with a S state would require probe commands to perform a broadcast invalidation of the other copies in other processing nodes. A write operation of a cache line with a S1 state would require a probe command to perform a directed invalidation of copies of the cache line within the same processing node. This embodiment is a variation of the MOESI coherency protocol. It is noted that a cache block with an EM state may be indistinguishable outside a processor core and corresponding cache memory subsystem since a processor may silently transition a block from the Exclusive state to the Modified state without probe commands.

The presence of a directory entry in the probe filter implies that the corresponding memory block has a copy cached. As used herein, the terms cache block and cache line are interchangeable during the below descriptions of the various embodiments. The absence of a directory entry implies the block is not stored in the cache memory subsystems 114. In one embodiment, when a cache conflict miss occurs in any processing node, all corresponding directory entries in all processing nodes for the affected cache block may be updated. For example, corresponding directory entries with an EM or an O state may have the data of the cache block copied back to the memory corresponding to the cache block and the directory state field may transition to an I state. Corresponding directory entries with a S1 or a S state may not have the data of the cache block copied back to memory and the directory state field may transition to an I state.

Figure 4:
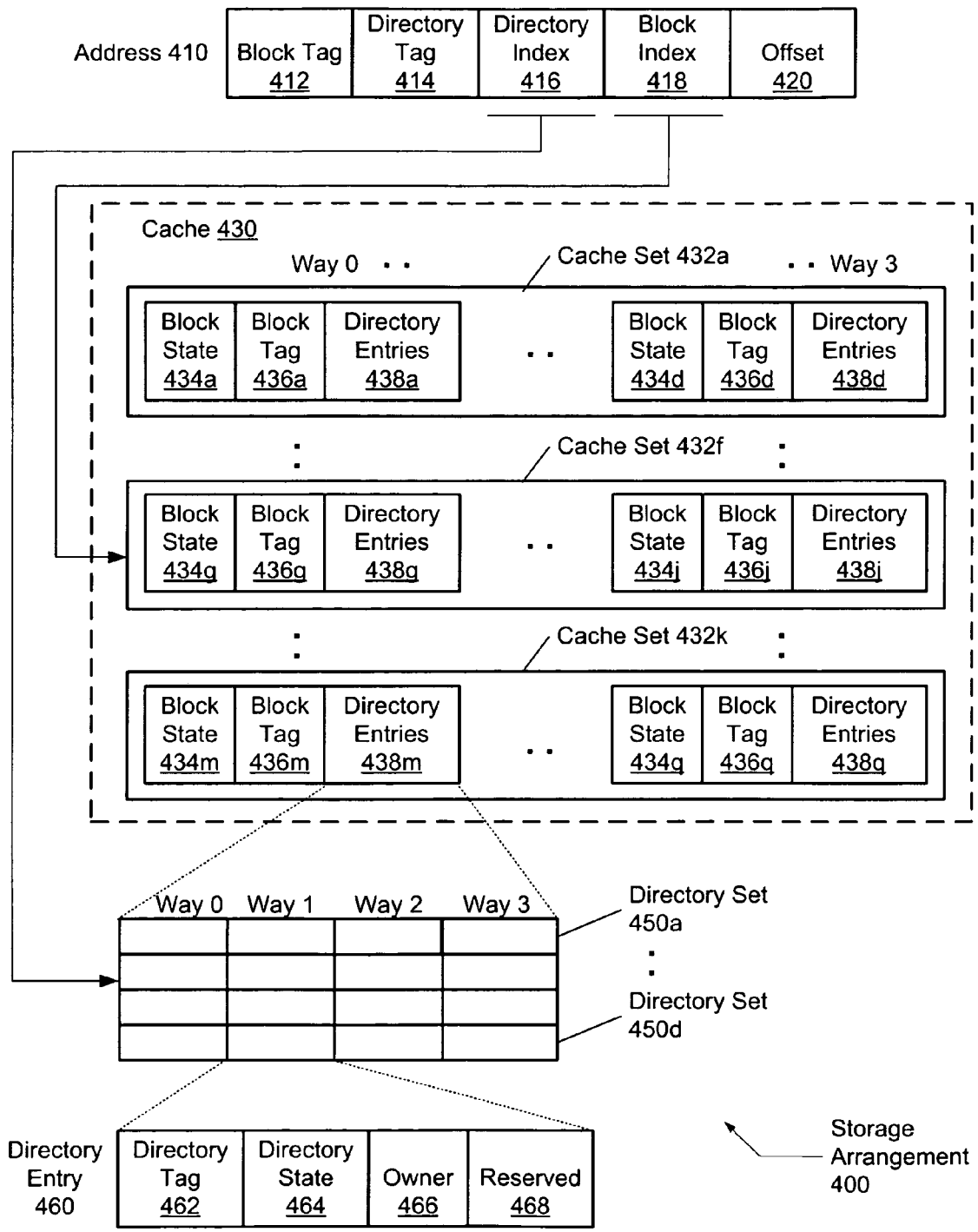
FIG. 4 is a generalized block diagram of one embodiment of a storage arrangement in which directory entries are stored using a 4-way cache organization.

The directory entries may be stored within shared cache memory 118 in various manners. For example, FIG. 4 illustrates one embodiment of a storage arrangement 400 in which directory entries are stored using a 4-way cache organization. The probe filter may also be 4-way set associative, but the probe filter directory entries may be smaller than the cache lines, or cache blocks. For example, in one embodiment, each directory entry 460 may include 32 bits (or 4 bytes). A tag field 462 may include 22 bits and it may be used to distinguish a directory entry from the other 3 entries in a directory set 450. A directory state field 464 may include 3 bits and it may be used to identify the state of a corresponding cache block, such as EM, O, S1, S, or I.

In one embodiment, an owner field 466 may include 3 bits and it may indicate which processing node 110 stores and possibly owns a corresponding cache block. The processing node 110 indicated by owner field 466 may store the only copy of a cache block with an 1M state. Alternatively, owner field 466 may indicate the processing node 110 that stores a copy of a cache block with an O state while other nodes 110 may store copies of the same cache block within cache memory subsystems 114. The 3-bit owner field 466 is sufficient to support 8 nodes. A reserved field 468 may include 4 bits and it may be used to indicate Least Recently Used (LRU) information for an eviction. LRU information may be used to indicate which entry in the directory set has been least recently referenced, and may be used in association with a cache replacement algorithm employed by a cache controller.

In a 4-way set associative scheme, directory set 450 includes 4 directory entries 460. A given directory set 450 may be selected from other sets by a directory index 416 portion of the address 410 used to access the shared cache memory subsystem 118. A directory entry 460 hit occurs when both the block tag 436 and the directory tag 462 match corresponding tag portions of the address (e.g. block tag 412 and directory tag 414) used to access the cache. The presence of a directory entry implies that the block is cached. The absence of a directory entry implies that the block is not cached.

In the embodiment shown, the 4 directory sets 450 each contain 4 directory entries 460. Each directory entry 460 comprises 4 bytes. Outside the probe filter, the directory entries 438 portion is the data portion of a cache line within 4-way set associative cache 430, which may be one embodiment of the shared cache memory subsystem 118. The data portion of a cache line, and the directory entries portion 438, store 64 bytes (4 bytes×4 directory entries×4 directory sets). Each of the 4 ways of cache 430 also has state information 434, which may comprise a valid bit and other state information of the cache line, and a block tag 436 to be used to determine which of the 4 cache lines are being accessed within a chosen cache set 432. In addition, offset 420 of address 410 may be used to indicate a specific byte or word within a cache line. For the directory entries 460, offset 420 may not be used. It is noted that a directory entry may be shared by multiple cached copies of a memory block, and thus, the coverage ratio of the probe filter increases.

A cache set 432 is chosen by the block index 418 of address 410. Although directory tag 462 may be stored in contiguous bits with the other components of directory entry 460, in one embodiment, block state 434 and block tag 436 may be stored in a separate array, rather than in a same array as directory entries 438.

Figure 5A:
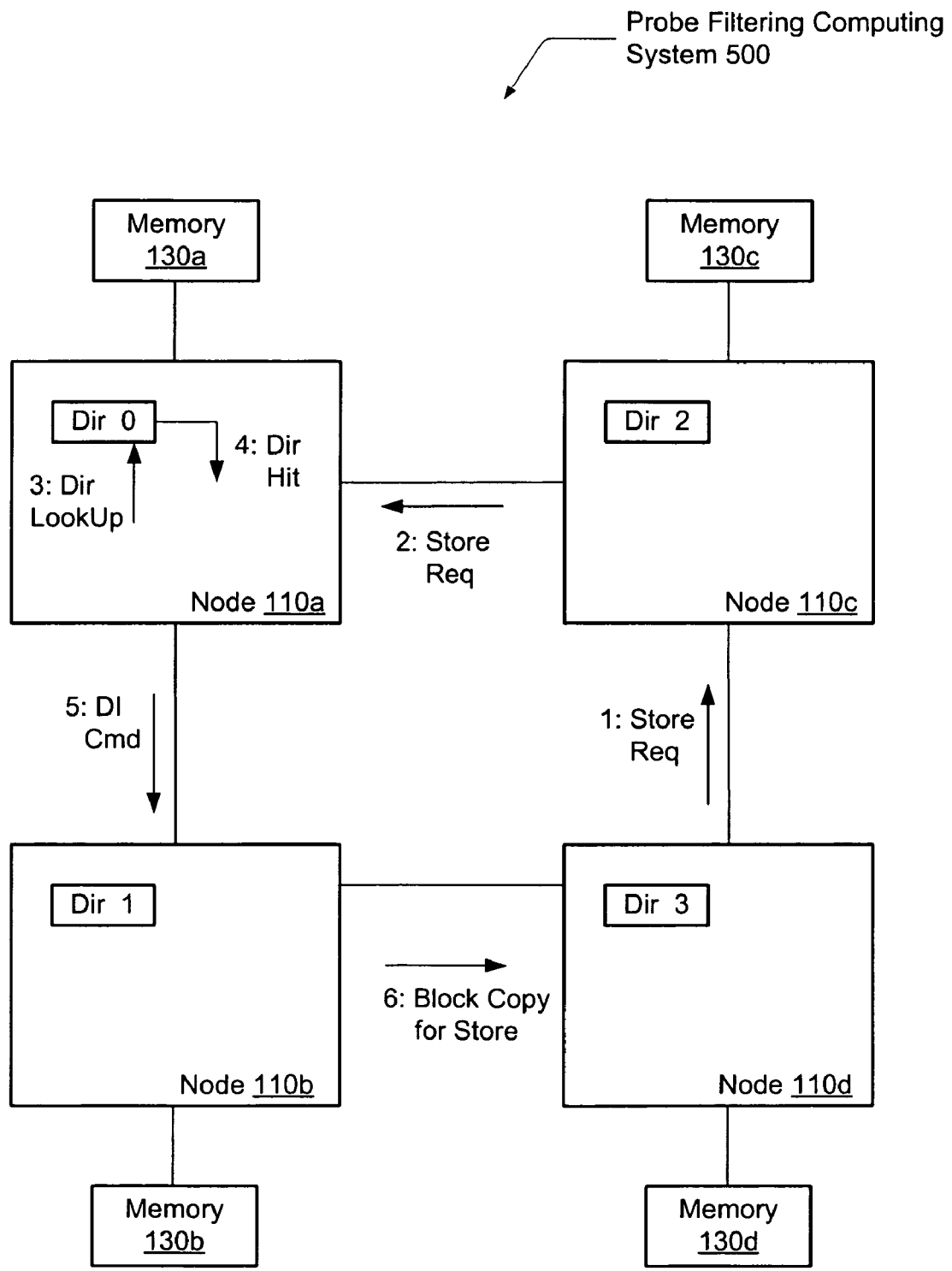
FIG. 5A is a generalized block diagram of one embodiment of a probe filtering computing system illustrating an exemplary set of operations that requires a single probe command.

Turning now to FIG. 5A, a block diagram of one embodiment of a probe filtering computing system 500 is shown illustrating an exemplary set of operations that requires a single probe command. Circuit portions that correspond to those of FIG. 1 are numbered identically. In one embodiment, system 500 comprises four nodes 110, but alternative embodiments may comprise a different number of nodes. Directories 0-3 illustrate the directory entries that may be stored in a shared cache memory subsystem 118, such as a L3 cache, within a processing node 110. Each memory line that is stored in a cache within system 500 has a corresponding directory entry. For example, each block of data within memory 130a that is stored in a cache in system 500 has a corresponding directory entry in Dir 0. Each block of data within memory 130b that is stored in a cache in system 500 has a corresponding directory entry in Dir 1, and so forth.

In one embodiment, the five states for a cache block in system 500 may be Invalidated (I), Owned (O), Shared within two or more nodes (S), Shared within only one node (S1), and Exclusive-Modified (EM). Generally speaking, there may be three types of request operations that may require subsequent probe commands. These request operations may be Fetch, Load, and Store. A Fetch request may be utilized to obtain a read-only copy of a cache line. In one embodiment, an instruction cache (i-cache) may send a Fetch request. A cache that sends a Fetch request may not be relied upon to ever store a most-recent copy of a cache line. Also, this cache may not have permission to modify the cache line. A Load request is a read operation and a Store request is a write operation.

Generally speaking, a processing node 110 that issues a request may be referred to as a "Requesting" node. A processing node 110 may be referred to as a "Home" node if the memory address of the request maps to a memory 130 coupled to that processing node. A processing node may be referred to as an "Owner" node if a cache within that processing node currently stores the most recent copy of the memory block. For example, node 110d may issue a Load request of a block of memory with an address that maps to memory 130a. However, a cache within node 110b may store the most recent copy of the block of data. In this example, node 110d is a "Requesting" node, node 110a is a "Home" node, and node 110b is an "Owner" node.

The set of operations in FIG. 5A include a Store request from node 110d, a "Requesting" node, to a block of data with an address that maps to memory 130a. In this case, node 110a is a "Home" node. In steps 1-2, the Store request is routed from node 110d to node 110a through node 110c. The routing of the request through node 110c is illustrative and other routing alternatives may be utilized, such as routing the request through node 110b. Steps 3-4 include a directory lookup performed by node 110a (e.g., by the corresponding coherency control circuit 124 in FIG. 3). The lookup determines whether a directory entry exists in the shared cache memory subsystem 118, or Directory 0, for the requested memory block. A subsequent directory hit occurs in a corresponding entry of the shared cache memory subsystem. The directory entry indicates the block is in the 1M state in processing node 110b, which is an "Owner" node. In step 5, the coherency control circuit 124 of processing node 110a accordingly causes a probe command to be forwarded to processing node 110b. This probe command causes node 110b to forward the data to processing node 110d in step 6. Also, the probe command may be directed to invalidate (DI) the corresponding cache line in node 110b.

The data may be installed in a cache within node 110d in an EM state. The Store operation may proceed and modify the data in the corresponding cache block. The coherency control circuit 124 of node 110a, the "Home" node, may update the corresponding directory entry for the block to indicate the most recent copy of the cache block is now in node 110d with an 1M state. In this case, the directory state field 464 in Directory 0 may continue indicating EM state, but the owner field 466 may be changed from indicating node 110b to indicating node 110d. In this example, it is noted since a directory hit occurred in node 110a for a cache block in the 1M state, processing node 110a was only required to transmit a single directed probe to one node (e.g. node 110b), rather than broadcast multiple probes to all nodes in system 500. When processing node 110d receives the data, a source done message may be transmitted from processing node 110d to processing node 110a through, for example, processing node 110c. This completes the transaction.

The above steps illustrated for FIG. 5A may be the same if the requested cache block had an S1 state in Directory 0. However, the update in Directory 0 would require the directory state field 464 to change from indicating S1 state to indicating EM state, while the corresponding owner field 466 still changes from indicating node 110b to indicating node 110d. It may also be required in certain cases (like this one) for a DRAM response to be generated in order to provide data to the requester. This is in contrast to the above where a DRAM response was not required since the owning node was guaranteed to respond with data (due to ME state). This can all be known based on the directory (probe filter) state.

Figure 5B:
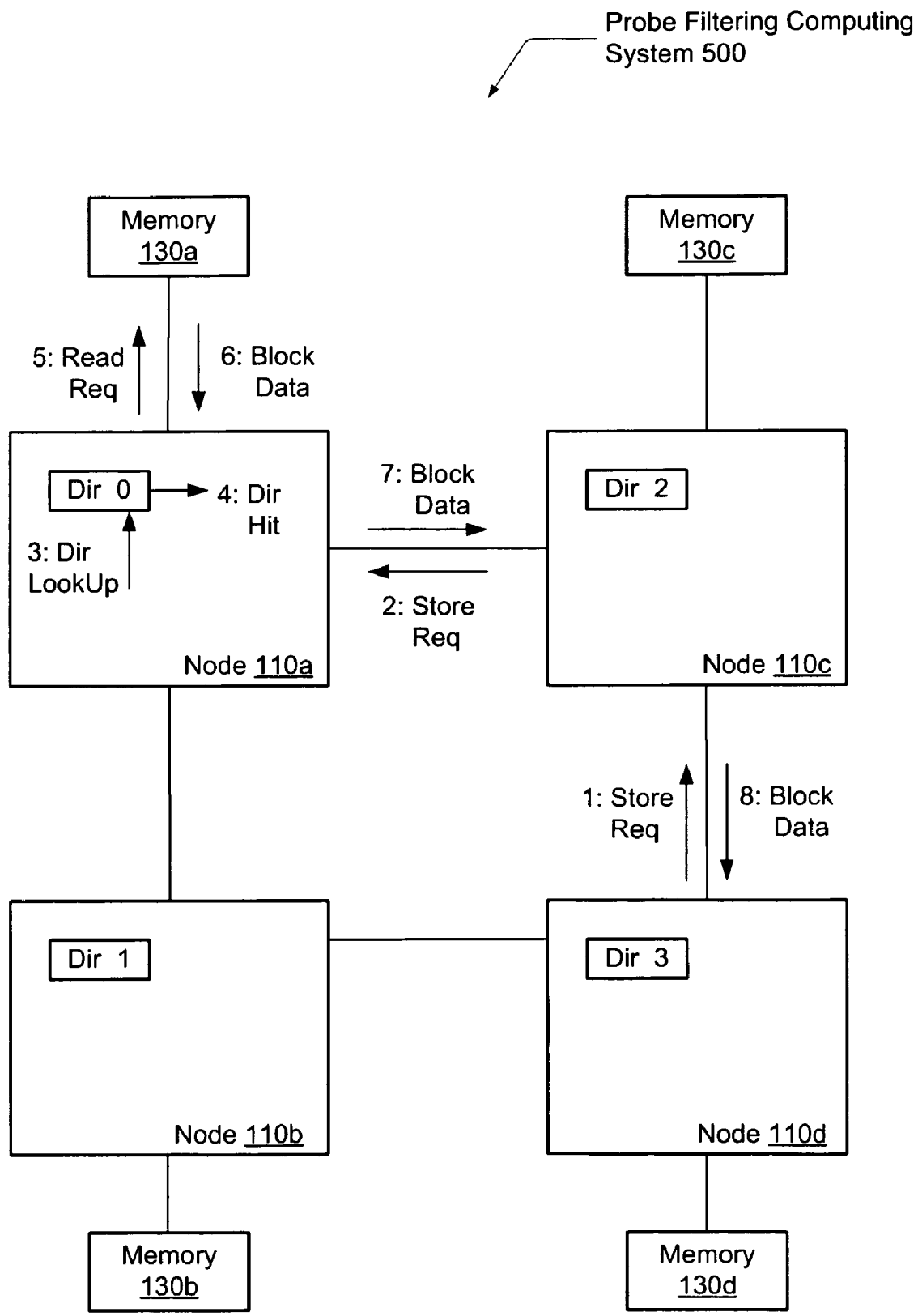
FIG. 5B is a generalized block diagram of one embodiment of a probe filtering computing system illustrating an exemplary set of operations that requires no probe command.

FIG. 5B illustrates a similar example in which processing node 110d, a "Requesting" node, issues a Store request to a block of memory with an address that maps to memory 130a. Node 110a is the "Home" node. In this example, the corresponding memory block is in a cache within system 500 with an I state. In steps 1-2, the Store request is routed from node 110d to node 110a through node 110c. Steps 3-4 include a directory lookup performed by the corresponding coherency control circuit 124 in node 110a. The lookup determines whether a directory entry exists in the shared cache memory subsystem 118, or Directory 0, for the requested memory block. A subsequent directory hit occurs in a corresponding entry of Directory 0. The corresponding directory state field 464 may indicate the block is in the I state.

In steps 5-8, node 110a retrieves the requested data from memory 130a, and provides the data to processing node 110d through processing node 110c. The data may be installed in a cache within node 110d in an EM state. The Store operation may proceed and modify the data in the corresponding cache block. The coherency control circuit 124 of node 110a, the "Home" node, may update the corresponding directory entry for the block to indicate the most recent copy of the cache block is now in node 110d with an EM state. In this case, the corresponding directory state field 464 in Directory 0 may change from indicating I state to indicating EM state. The owner field 466 may be changed to indicating node 110d.

In this example, it is noted since a directory hit occurred in node 110a for a cache block in the I state, processing node 110a was not required to transmit any probes to any node in system 500. This is also shown in Table 1 above wherein a directory hit on an entry with a corresponding I state is followed by no probes being sent to any node. The same effect of no probe commands being sent results from directory misses as well. All probes are filtered during this type of directory hit regardless of the type of memory access request. Therefore, network traffic may be greatly reduced. When processing node 110d receives the data, a source done message may be transmitted from processing node 110d to processing node 110a through, for example, processing node 110c. This completes the transaction.

Figure 5C:
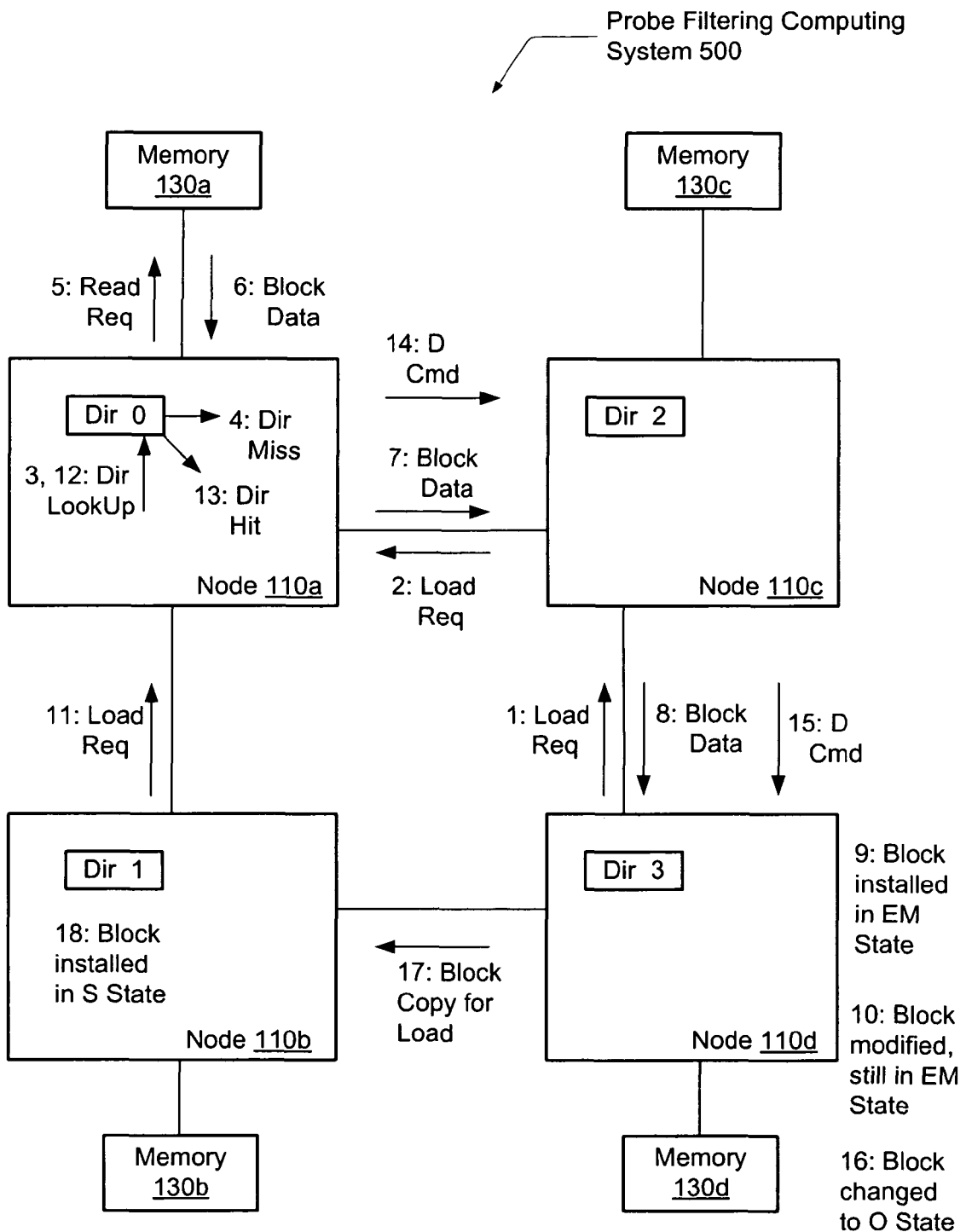
FIG. 5C is a generalized block diagram of one embodiment of a probe filtering computing system illustrating back-to-back load operations and the corresponding transmission of probe commands.

FIG. 5C illustrates an example in which processing node 110d, a "Requesting" node, issues a Load request to a block of memory with an address that maps to memory 130a. Node 110a is the "Home" node. In this case, the memory block is not stored in any cache in system 500. In steps 1-2, the Load request is routed from node 110d to node 110a through node 110c. Steps 3-4 include a directory lookup of Directory 0 performed by the corresponding coherency control circuit 124 within node 110a. The lookup determines whether a directory entry exists for the requested memory block in the shared cache memory subsystem 118, or Directory 0, for the requested memory block. A subsequent directory miss occurs. Since a directory entry does not exist, the memory block is not stored in a cache in system 500.

In steps 5-9, node 110a retrieves the requested data from memory 130a, and provides the data to processing node 110d through processing node 110c. The data may be installed in a cache within node 110d in an EM state. The Load operation may proceed and read the data from the corresponding cache block. The coherency control circuit 124 of node 110a, the "Home" node, may enter a new corresponding directory entry for the block to indicate the most recent copy of the cache block is now in node 110d with an EM state. When the new corresponding directory entry is being entered into Directory 0, a conflict miss may occur and a different directory entry may need to be evicted. Details regarding an eviction are discussed further below. The corresponding directory state field 464 in Directory 0 for the new directory entry may indicate an EM state. The owner field 466 may indicate node 110d.

It is noted since a directory miss occurred in node 110a for the requested cache block, processing node 110a was not required to transmit any probe to any node in system 500. When processing node 110d receives the data, a source done message may be transmitted from processing node 110d to processing node 110a through, for example, processing node 110c. This completes the transaction. However, later, in step 10, a processor within node 110d may modify this cache block. It is noted that no probes are sent. The corresponding directory entry in Directory 0 still indicates this cache block is in EM state.

In step 11, a Load request for the same memory block is routed from node 110b to node 110a. Steps 12-13 include a directory lookup of Directory 0 performed by the corresponding coherency control circuit 124 within node 110a. The lookup determines whether a directory entry exists for the requested memory block in the shared cache memory subsystem 118, or Directory 0, for the requested memory block. A subsequent directory hit occurs in the corresponding entry of the shared cache memory subsystem. The directory entry indicates the block is in the EM state in processing node 110d, which is the "Owner" node. In steps 14-15, the coherency control circuit 124 of processing node 110a accordingly causes a single directed probe command (D) to be forwarded to processing node 110d. This probe command causes node 110d to forward the requested data to processing node 110b in step 16. It is noted that node 110a is not required to send a broadcast of probes all nodes within system 500.

In step 17, the data may be installed in a cache within node 110b in a S state. The Load operation may proceed and read the data in the corresponding cache block. The coherency control circuit 124 of node 110a, the "Home" node, may update the corresponding directory entry for the block to indicate the most recent copy of the cache block is still in node 110d but now with an O state. In this case, the corresponding directory state field 464 in Directory 0 may changed from indicating an EM state to indicating an O state. The owner field 466 continues to indicate node 110d. Also, when processing node 110b receives the data, a source done message may be transmitted from processing node 110b to processing node 110a. This completes the transaction.

It is noted that the number of probes sent in system 500 may be reduced For purposes of discussion, the steps in the embodiments shown in FIG. 5A-5C may occur in sequential order. However, some steps may occur in a different order than shown, some steps may be performed concurrently, some steps may be combined with other steps, and some steps may be absent in another embodiment.

A variety of other specific coherency operations may be invoked in response to other transactions initiated by a processing node. Similar to the foregoing examples, probe commands and network response traffic may be filtered based upon the existence of a directory entry for a block being accessed, and/or based upon the state of the block as indicated in a directory entry. Also, memory access latency may be reduced due to the reduction in probe commands and network response traffic. Various other specific coherency operations may similarly be performed, as appropriate, depending upon the type of transaction, the existence of a directory entry, and the state of the block in the directory entry.

Many other directory entry formats are possible in other embodiments. The specific format of a directory entry may be based on the amount of state information that is kept, the scalability of the system, and the directory storage overhead, among other factors.

Table 1 below displays transaction scenarios for a probe filter hit in a directory within an "Owner" processing node. The transaction scenarios are shown by combinations of cache block states in the top row versus memory access requests in the left-most column. In one embodiment, there may be five states for a cache block, such as Invalidated (I), Owned (O), Shared within two or more nodes (S), Shared within only one node (S1), and Exclusive-Modified (EM). A sample of memory access requests, in one embodiment, may include Fetch, Load, Store, and Change-to-Dirty (CtoD) commands. A further description of these requests is given shortly below. These four requests are shown for illustrative purposes. Other embodiments may have a different number of requests and may include none, one, or multiple of these same requests that are shown.

A possible action taken by a processing node, such as a "Home" node, regarding probe commands for each combination of cache line state and request operation is shown in the entries of Table 1. A probe command may be filtered (–) and no probes are sent. A probe command may be directed (D) to a specific node, such as an "Owner" node, in order to forward a copy of a cache line to another node, such as a "Requesting" node, and to change a state of the cache line to a state other than Invalidated (I). A probe command may be directed to invalidate (DI) a cache line in a specific node. Finally, a probe command may be broadcast (B) to all nodes in order to invalidate multiple copies of a cache line.

TABLE 1

Probe Filter (PF) Transaction Scenarios for a PF Hit

|       | I | O | S | S1 | EM |
|-------|---|---|---|----|----|
| Fetch | — | D | — | —  | D  |
| Load  | — | D | — | —  | D  |
| Store | — | B | B | DI | DI |
| CtoD  | — | B | B | B  | B  |

A Fetch request may be utilized to obtain a read-only copy of a cache line. In one embodiment, an instruction cache (i-cache) may send a Fetch request. A cache that sends a Fetch request may not be relied upon to ever have a most-recent copy of a cache line. Also, this cache may not have permission to modify the cache line. A Load request is a read operation and a Store request is a write operation. A CtoD request is generated when a processor within a node wants write permission but it already has a valid copy of the block, which may have a corresponding S state or O state. In contrast, a Store request is generated when the requesting processor does not already have a valid copy of the cache block. With a CtoD request, a response does not return data from system memory, such as DRAM. A description of the states, operations requests, and actions displayed in Table 1 is provided in the following. In one embodiment, a probe filter may be stored in a cache 430 within a processing node 110. In one embodiment, a shared cache memory subsystem 118, which may be a L3 cache, may be the chosen cache to store a probe filter directory. Examples to highlight the actions taken in Table 1 are provided below in reference to FIG. 5A-FIG. 5C.

Taking FIG. 5A as an example of one embodiment, each processing node 110 may include a probe filter directory. The probe filter directory may store the state of a block from corresponding memory 130, wherein the address of the block maps to the node's corresponding memory 130 and the block currently resides in a cache in any of the processing nodes 110 in computing system 100. Table 1 displays the actions taken for a cache block, wherein its corresponding address maps to a "Home" node. If a copy of the memory block is in a cache in another node, designated as an "Owner" node, this information is stored in the probe filter directory within the "Home" node. Therefore, a "Home" node has an indication stored in the probe filter directory, such as owner field 466, of which other node may be the "Owner" node of the corresponding cache block and an indication stored in the probe filter directory, such as state field 464, of the state of the cache block in the "Owner" node. For all requests, a corresponding cache line with an I state stored in the probe filter of a "Home" node requires no probe commands as shown in Table 1. The data of the requested cache block is loaded from the corresponding memory 130 and sent to the "Requesting" node. No probes are necessary.

A "Requesting" node may send a Fetch or a Load request to a "Home" node. There may be a subsequent probe filter hit in the directory of the "Home" node. The corresponding directory entry may indicate the requested cache block resides in another node, such as an "Owner" node. In one embodiment, the state of the copy of the cache block in the "Owner" node may be O. Table 1 displays a directed probe (D) is necessary when a Fetch or a Load request from a "Requesting" node has a subsequent probe filter hit in the directory of a "Home" node and the cache line in an "Owner" node has an O state. The "Home" node may need to send a directed probe command (D) to the "Owner" node in order for the "Owner" node to forward the requested data to the "Requesting" node. A directed probe command is only one probe. Broadcast probe commands are not necessary. Other copies of the cache line may exist in the "Owner" node and in other nodes, but the most updated copy is the corresponding copy in the probe filter of the "Home" node.

Likewise, the state of the copy of the cache block in the "Owner" node may be EM. Table 1 displays a directed probe (D) is necessary when a Fetch or a Load request from a "Requesting" node has a subsequent probe filter hit in the directory of a "Home" node and the cache line in an "Owner" node has an EM state. The "Home" node may need to send a directed probe command (D) to the "Owner" node in order for the "Owner" node to forward the requested data to the "Requesting" node. A directed probe command is only one probe.

Referring to FIG. 5A, in one embodiment, a memory block in memory 130a may have a copy of its data stored in a cache in an "Owner" node, such as node 110d, and the cache line in the "Owner" node may have an O state or an EM state as in the above examples. In this embodiment and in such a scenario, it may be impossible for such a cache block to have a S or a S1 state stored in the probe filter of the "Home" node. For example, if node 110d performs a read request, such as a Fetch or a Load, of a non-cached memory block in memory 130a, then after a read request is sent from node 110d to node 110a, there will be a probe filter miss in Directory 0, since the memory block has not been cached yet. The memory block may be read from memory 130a by node 110a and sent to node 110d. The cache block is stored in node 110d with an EM state. Also, a directory entry, such as directory entry 460, within Directory 0 may be updated for this cache block. It is possible a cache conflict miss occurs within a directory set 450 and a separate directory entry needs to be evicted. Further details concerning this scenario are provided below.

Subsequently, if node 110b performs a read request, such as a Fetch or a Load, of the same memory block, then there will be a probe filter hit in Directory 0, since the memory block has been cached in node 110d. A single directed probe command (D) may be sent from node 110a to node 110d that commands node 110d to provide a copy of the data of the requested cache line to node 110b. This data may be stored in node 110b with a S state. The corresponding information in Directory 0 for this cache line may be updated to show that the owner is still node 110d and the state is changed from EM to O. The single directed probe command (D) is shown in Table 1 in the table entry Fetch-EM and Load-EM.

A "Requesting" node may send a Store request to a "Home" node. There may be a subsequent probe filter hit in the directory of the "Home" node. The corresponding directory entry may indicate the requested cache block resides in another node, such as an "Owner" node. In one embodiment, the state of the copy of the cache block in the "Owner" node may be O or S. In this case, other copies of the cache block exist in other processing nodes. The "Home" node may need to send a directed probe command to the "Owner" node in order for the "Owner" node to forward the requested data to the "Requesting" node. Following, the "Requesting" node becomes the new "Owner" node and the cache block has its state changed from O or S to EM. Also, broadcast probe commands (B) are sent to all processing nodes in order to invalidate any other copies of the requested cache block. The broadcast probe commands (B) for invalidating other copies of the cache block is shown in Table 1 in the table entries Store-O and Store-S.

Similarly, when the state of the copy of the cache block in the "Owner" node is S1 or EM, other copies of the cache block do not exist in other processing nodes other than the "Owner" node. The "Home" node may need to send a directed probe command to the "Owner" node in order for the "Owner" node to forward the requested data to the "Requesting" node. Following, the "Requesting" node becomes the new "Owner" node and the cache block has its state changed from S1 to EM. If the corresponding state is already EM, then the state is unchanged. Also, a single directed probe command to invalidate (DI) is sent from the "Home" node to the "Owner" node in order to invalidate the copies of the requested cache block within the "Owner" node. The single directed probe commands to invalidate (DI) is shown in Table 1 in the table entries Store-S1 and Store-EM.

Table 2 below displays transaction scenarios for a probe filter eviction of a directory entry within a "Home" processing node. The states, operations requests, and actions in Table 2 have the same definitions as they do for Table 1.

TABLE 2

Probe Filter (PF) Transaction Scenarios for a PF Eviction

|       | I | O | S | S1 | EM |
|-------|---|---|---|----|----|
| Fetch | — | B | B | DI | DI |
| Load  | — | B | B | DI | DI |
| Store | — | B | B | DI | DI |
| CtoD  | — | B | B | DI | DI |

As discussed above, the reserved field 468 within a directory entry 460 may include LRU information. The LRU information may be used to indicate which directory entry 460 within a directory set 450 has been least recently referenced. The LRU information may be used in association with a cache replacement algorithm employed by a cache controller. In one embodiment, the directory state field 464 may be used in a cache replacement algorithm. For example, if a directory entry 460 has an I state, this information may be used within the cache replacement algorithm to ensure invalidated directory entries are evicted prior to entries with other states. Further, the algorithm may give higher priority for eviction to a group of valid directory states over a second group of valid directory states. For example, directory entries with EM or S1 directory states may have higher priority for eviction than directory entries with O or S directory states due to the number of nodes which may possibly be caching the corresponding data.

A "Requesting" node, such as node 110*d* in FIG. 5A, may send a request (e.g. Fetch, Load, or Store) to a "Home" node, such as node 110*a*. If the corresponding data is not stored in any cache in computing system 100, then there may be a subsequent probe filter miss in the directory of the "Home" node. The requested data may be read from memory 130*a* by node 110*a* and forwarded to node 110*d*. The corresponding cache block may be stored in a cache with an EM state within the "Requesting" node. Also, a directory entry, such as directory entry 460, within Directory 0 of the "Home" node may be updated for this cache block. During this update, it is possible a directory conflict miss occurs within a directory set 450 and an existing directory entry needs to be evicted.

For all requests (e.g. Fetch, Load, Store, CtoD, etc.) from the "Requesting" node to the "Home" node, a chosen directory entry to be evicted with an I state stored in the probe filter of a "Home" node may not require any probes to be sent from the "Home" node. The filtering of probes (–) for an evicted directory entry with an I state is shown in the first column of Table 2. The ability to not send any probes for this eviction case may reduce network traffic.

If a chosen directory entry to be evicted has an O state or a S state, then broadcast probe commands (B) are sent from the "Home" node to all other processing nodes in order to invalidate any other copies of the corresponding cache block. The data for a cache block with an O state may be written back to its corresponding memory in its corresponding processing node. The broadcast probe commands (B) for invalidating copies of the cache block corresponding to an evicted directory entry with an O state or a S state is shown in Table 2.

Similarly, if a chosen directory entry to be evicted has a S1 state or an EM state, then a single directed probe command to invalidate (DI) is sent from the "Home" node to the "Owner" node in order to invalidate the copies of the requested cache block within the "Owner" node. The data for a cache block with an EM state may be written back to its corresponding memory in its corresponding processing node, which is the "Home" node in this case. The single directed probe command to invalidate (DI) a copy of the cache block corresponding to an evicted directory entry with a S1 state or an EM state is shown in Table 2.

Although the embodiments above have been described in considerable detail, numerous variations and modifications will become apparent to those skilled in the art once the above disclosure is fully appreciated. It is intended that the following claims be interpreted to embrace all such variations and modifications

What is claimed is:

1. A computing system comprising:
a processor core;
a shared cache memory subsystem comprising a plurality of shared entries for storing data accessible by one or more processor cores;
a shared cache controller for the shared cache memory subsystem; and
wherein the shared entries are configured to selectively store either processor data or directory entries comprising directory information for controlling a global coherence protocol;
wherein the shared cache controller is configured to store a value to control whether at least some of the shared entries store processor data or directory information; and
wherein an initially cached copy of processor data following a corresponding miss in the directory entries for any type of memory access request has an exclusive-modified (EM) state placed in its corresponding directory entry;
wherein each cached copy of data corresponding to an address location mapped to a location in a first system memory has a corresponding directory entry, wherein said directory information indicates whether said cached copy is in an EM, owned, shared, a shared-one or invalid state, wherein the shared-one state indicates all cached copies of the corresponding data exist in a single node, and wherein directory entries with the shared-one state have a higher priority for eviction in a cache replacement algorithm than directory entries with owned or shared states.

2. The computing system as recited in claim 1, wherein a given line of storage of said shared cache memory subsystem includes a plurality of directory entries.

3. The computing system as recited in claim 1, wherein the EM state has a higher priority for eviction in a cache replacement algorithm than directory entries with owned or shared states.

4. The computing system as recited in claim 3, wherein said processor core, said cache memory subsystem, and said shared cache memory subsystem form portions of a first processing node, and wherein said first processing node is coupled to a second processing node including a second system memory.

5. The computing system as recited in claim 3, wherein cached data associated with a request is directly sent to a requesting processing node rather than an associated home node.

6. The computing system as recited in claim 3, wherein a designated way of said shared cache memory subsystem is selectively enabled to store directory information.

7. The computing system as recited in claim 1, wherein the shared cache controller is further configured to change the EM state in the corresponding directory entry for the initially cached copy to an owned (O) state when a second copy of the cached copy is created.

8. The computing system as recited in claim 1, wherein the shared cache controller produces no probe commands when the initially cached copy in the EM state is modified.

9. The computing system as recited in claim 8, wherein the EM state which is changed to an O state when a second copy of the cached copy is created corresponds to unmodified data.

10. A method for selectively transmitting probe commands comprising:
storing selectively in a shared cache memory subsystem either processor data or directory entries comprising directory information for controlling a global coherence protocol;
storing a value to control whether at least some of the shared entries store processor data or directory information;
placing an exclusive-modified (EM) state in a corresponding directory entry for an initially cached copy of processor data following a corresponding miss in the directory entries for any type of memory access request; and
storing a directory entry for each cached copy of data corresponding to an address location mapped within a first system memory;
selectively transmitting probe commands to one or more processing nodes depending upon said directory information;
indicating whether said cached copy is in an exclusive-modified, owned, shared, a shared-one or invalid state, wherein the shared-one state indicates all cached copies of the corresponding data exist in a single node;
wherein directory entries with the EM state or the shared-one state have a higher priority for eviction in a cache replacement algorithm than directoy entries with owned or shared states.

11. The method as recited in claim 10, wherein cached data associated with a request is directly sent to a requesting processing node rather than an associated home node.

12. A shared cache memory subsystem comprising:
an interface configured to communicate with one or more cache memory subsystems;
a plurality of shared entries; and
a cache controller;
wherein the shared entries are configured to store either processor data or directory entries comprising directory information for controlling a global coherence protocol;
wherein the cache controller is configured to store a value to control whether at least some of the shared entries store processor data or directory information; and
wherein an initially cached copy of processor data following a corresponding miss in the directory entries for any type of memory access request has an exclusive-modified (EM) state placed in its corresponding directory entry;
wherein each cached copy of data corresponding to an address location mapped within a first system memory has a corresponding directory entry;
wherein directory information is conveyed to a memory controller coupled to packet processing logic in order to transmit selectively probe commands to one or more processing nodes, and wherein directory entries with the EM state or the shared-one state have a higher priority for eviction in a cache replacement algorithm than directory entries with owned or shared states.

13. A computing system comprising:
a processor core;
a shared cache memory subsystem comprising a plurality of shared entries for storing data accessible by one or more processor cores;
a shared cache controller for the shared cache memory subsystem; and
wherein the shared entries are configured to selectively store either processor data or directory entries comprising directory information for controlling a global coherence protocol;
wherein the shared cache controller is configured to store a value to control whether at least some of the shared entries store processor data or directory information; and
wherein an initially cached copy of processor data following a corresponding miss in the directory entries for any type of memory access request has an exclusive-modified (EM) state placed in its corresponding directory entry;
wherein the EM state has a higher priority for eviction in a cache replacement algorithm than directory entries with owned or shared states.

14. A method for selectively transmitting probe commands comprising:
storing selectively in a shared cache memory subsystem either processor data or directory entries comprising directory information for controlling a global coherence protocol;
storing a value to control whether at least some of the shared entries store processor data or directory information;
placing an exclusive-modified (EM) state in a corresponding directory entry for an initially cached copy of processor data following a corresponding miss in the directory entries for any type of memory access request;
wherein directory entries with the EM state have a higher priority for eviction in a cache replacement algorithm than directory entries with owned or shared states.

15. A shared cache memory subsystem comprising:
an interface configured to communicate with one or more cache memory subsystems;
a plurality of shared entries; and
a cache controller;
wherein the shared entries are configured to store either processor data or directory entries comprising directory information for controlling a global coherence protocol;
wherein the cache controller is configured to store a value to control whether at least some of the shared entries store processor data or directory information;
wherein an initially cached copy of processor data following a corresponding miss in the directory entries for any type of memory access request has an exclusive-modified (EM) state placed in its corresponding directory entry; and
wherein directory entries with the EM state have a higher priority for eviction in a cache replacement algorithm than directory entries with owned or shared states.

* * * * *